(12) United States Patent
Ng et al.

(10) Patent No.: US 8,879,916 B1
(45) Date of Patent: Nov. 4, 2014

(54) METHODS AND APPARATUS FOR LOCKING THE OPTICAL PHASE OF SINGLE-SIDEBAND AMPLITUDE-MODULATION SIGNALS

(75) Inventors: Willie W. Ng, Agoura Hills, CA (US); David L. Persechini, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 429 days.

(21) Appl. No.: 13/310,770

(22) Filed: Dec. 4, 2011

(51) Int. Cl.
*H04B 10/00* (2013.01)
*H04J 14/00* (2006.01)

(52) U.S. Cl.
USPC .......................................... 398/116; 398/115

(58) Field of Classification Search
CPC ............... H04B 10/2575; H04B 10/25759; H04B 10/615
USPC ................................................ 398/115, 116
See application file for complete search history.

(56) References Cited

U.S. PATENT DOCUMENTS 7,006,726 B2  2/2006 Hayes
2009/0208209 A1  8/2009 Ng et al.

OTHER PUBLICATIONS

W. Ng, T. Rockwood, D. Persechini, D. Chang, "High-Q Si microresonators formed by substrate transfer on silica waveguide wafers", Optics Express 18(26), 27004-27015 (2010).

*Primary Examiner* — Daniel Dobson
(74) *Attorney, Agent, or Firm* — O'Connor & Company (57) ABSTRACT

This invention provides an approach to lock the optical phase of a single sideband, carrier-suppressed coherent-AM analog optical link, so that for example an RF signal can be transmitted with high fidelity over fibers. In some embodiments, a method comprises providing a RF locking signal; impressing an RF input signal and the RF locking signal onto the optical field of a suppressed carrier; introducing the optical spectrum to a photonic integrated circuit comprising a microresonator filter and a finite impulse response filter; selectively passing the double sideband, associated with the locking frequency, through the finite impulse response filter; and recovering a RF output signal, wherein a feedback loop provides dithering to stabilize the optical phase of the link and thus preserve amplitude/phase integrity for the RF-photonic signal. The disclosed method is especially suited to the filtering of RF-photonic signals via use of the resonance passbands derived from microdisks or micro-rings.

29 Claims, 5 Drawing Sheets

METHODS AND APPARATUS FOR LOCKING THE OPTICAL PHASE OF SINGLE-SIDEBAND AMPLITUDE-MODULATION SIGNALS

FIELD OF THE INVENTION

The present invention generally relates to communication systems, and more specifically to methods and devices for locking the optical phase of coherent-AM analog optical links.

BACKGROUND OF THE INVENTION

The ever-increasing demand for broadband communication systems has led to optical-transmission systems based on optical waveguides such as fiber optics and optical processing elements for use in these systems. Generally, in high-performance communication systems, photons continue to supplant electrons as data messengers. Significant effort has been spent towards optical integrated circuits with high complexity and advanced functionality.

Amplitude modulation (AM) is well-known in electronic communications, most commonly for transmitting information via a radio carrier wave. Amplitude modulation works by varying the strength of the transmitted signal in relation to the information being sent. Amplitude modulation produces a modulated output signal that has twice the bandwidth of the original baseband signal. In the frequency domain, amplitude modulation produces a signal with power concentrated at the carrier frequency and in two adjacent sidebands. Each sideband is equal in bandwidth to that of the modulating signal and is a mirror image of the other. Amplitude modulation that results in two sidebands and a carrier is called double-sideband amplitude modulation. Single-sideband modulation is a refinement of amplitude modulation that more efficiently uses electrical power and bandwidth.

In some applications, an optical carrier is amplitude-modulated with an RF signal to generate the transmitted signal. While amplitude modulation of RF signals is relatively insensitive to environmental changes, the same cannot be said for optical signals. The reason is the wavelengths used. The RF signal wavelength is orders of magnitude longer than the optical signal wavelength. Hence even minor variations in the optical signal environment can produce unacceptable variations in the phase of the received optical signal.

Channelizing, or channelization, is generally the division of a single wide-band (high-capacity) communications channel into many relatively narrow-band (lower-capacity) channels. As used herein, channelization specifically refers to the filtering or division of a broadband microwave or radio frequency (RF) signal into narrower frequency-bands or channels. In defense-related systems, one can encounter threats over a broad spectrum of radio frequencies. The systems need to cover a large spectrum, with sufficient selectivity to separate simultaneously received signals that are closely spaced in frequency. These requirements can be met through channelization. High-resolution RF-photonic channelizers may incorporate various types of AM links, such as optical carrier-suppressed modulation in which only the sidebands of an amplitude-modulated carrier wave are transmitted, the optical carrier being removed.

Optical carrier-suppressed coherent-AM links are desired for many commercial applications, including RF transmission over optical fibers. HRL Laboratories (Malibu, Calif., US) has demonstrated, using a double-balanced receiver, a link spurious-free dynamic range of 124 dB-Hz at 10 GHz with a current of only 4 mA per photodiode, for RF transmission over optical fibers. See U.S. Pat. No. 7,006,726 for "METHOD AND APPARATUS FOR OPTICAL DIVISION OF A BROADBAND SIGNAL INTO A PLURALITY OF SUB-BAND CHANNELS" to Hayes and U.S. patent application Ser. No. 12/183,064 for "RECONFIGURABLE OPTICAL FILTERS FORMED BY INTEGRATION OF ELECTRICALLY TUNABLE MICRORESONATORS" by Willie Ng et al., which are hereby incorporated by reference herein in their entireties.

Optical microresonators can be considered as promising building blocks for filtering, amplification, switching, and sensing. Active functions can be obtained by monolithic integration or hybrid approaches using materials with thermo-optic, electro-optic, and optoelectronic properties and materials with optical gain. In a common configuration in microresonator-based sensors, a microresonator is placed in close proximity to an optical waveguide such as an optical fiber whose geometry has been specifically tailored. The tapering modifications to the waveguide result in a substantial optical field outside the waveguide, so that light can couple into the microresonator and excite its eigenmodes.

Ng and co-workers, at HRL Laboratories, have recently demonstrated Si microresonators fabricated via substrate transfer on a silica waveguide wafer. Ng et al. report a first step towards this integration approach with a successful demonstration of evanescent coupling between Si microresonators and robustly bonded silica waveguides. See W. Ng, Rockwood, Persechini and Chang, "High-Q Si microresonators formed by substrate transfer on silica waveguide wafers," *Optics Express* 18(26), 27004-27015 (2010) which is incorporated by reference herein in its entirety. To date, microresonators have not been utilized in conjunction with coherent-AM links.

There remains a desire to improved methods and systems for optical carrier-suppressed amplitude modulation of a radio-frequency input signal and in particular to reduce the sensitivity of the received optical phase to environmental changes. One particular desire is a method to lock the optical phase of a single-sideband (SSB), carrier-suppressed coherent amplitude-modulation analog optical link. By locking the optical phase, an RF signal can be can be transmitted with high fidelity over optical fibers, while preserving amplitude and phase integrity for the RF-photonic signal. The principals of the invention described herein at least partially solve the problem of environmental changes perturbing the received phase of an optical carrier-suppressed signal.

SUMMARY OF THE INVENTION

The present invention addresses the aforementioned needs in the art, as will now be summarized and further described in detail below.

In some embodiments, this invention provides a method of carrier-suppressed amplitude modulation of a radio-frequency input signal, the method comprising:

(a) receiving a radio-frequency input signal;

(b) providing a radio-frequency locking signal having a locking frequency;

(c) providing a single-frequency optical carrier signal;

(d) splitting the optical carrier signal to a signal arm and a local-oscillator arm, wherein the optical carrier signal is partially or completely suppressed via optical modulator bias in the signal arm to form a suppressed carrier;

(e) impressing the radio-frequency input signal and the radio-frequency locking signal onto the optical field of the suppressed carrier using an electro-optic modulator (e.g., a Mach-Zehnder electro-optic modulator biased at extinction), thereby generating an optical spectrum in the signal arm;

(f) introducing the optical spectrum to a photonic integrated circuit comprising a microresonator filter and a finite impulse response filter, wherein the optical spectrum is split to pass (1) a first optical signal through a first waveguide branch coupled to the microresonator filter and (2) a second optical signal through a second waveguide branch coupled to the finite impulse response filter;

(g) filtering out one sideband of the first optical signal with the microresonator filter, to generate a filtered first optical signal;

(h) selectively passing the double sideband, associated with the locking frequency, of the second optical signal through the finite impulse response filter, to generate a filtered second optical signal;

(i) introducing the filtered first optical signal and the filtered second optical signal to a double-balanced receiver; and (j) recovering a radio-frequency output signal from the double-balanced receiver, wherein a feedback loop from the radio-frequency output signal back to the local-oscillator arm is configured to provide dithering to at least partially stabilize the differential phase between the signal arm and the local-oscillator arm.

The radio-frequency input signal may be derived from a channelized spectrum. In some embodiments, the amplitude modulation is temporally coherent for heterodyne photodetection. In some embodiments, the method comprises amplitude modulation of the radio-frequency input signal over optical fibers.

During step (f), the optical spectrum may be split evenly to the microresonator filter and to the finite impulse response filter. In other embodiments, the optical spectrum is not split evenly to the microresonator filter and to the FIR filter.

In the photonic integrated circuit, the microresonator filter may be an infinite impulse response filter. The finite impulse response filter may be, for example, a two-tap transversal filter or an eight-tap transversal filter. In certain embodiments, the finite impulse response filter has a free spectral range of about 20 GHz.

In preferred embodiments, the differential phase between the signal arm and the local-oscillator arm is periodically, or continuously, adjusted toward a maximum for the radio-frequency output signal. Preferably, the radio-frequency output signal is phase-stabilized in the presence of environmental perturbations or random fluctuations. The dithering step may utilize a dithering frequency selected from about 100 Hz to about 300 Hz, for example.

In some embodiments, the method further comprises configuring a radio-frequency antenna photonic channelizer with a link for providing the carrier-suppressed amplitude modulation of an input signal to an antenna. The method may be adapted for fiber-remoting of the antenna.

Other variations of the invention provide a method for locking the optical phase of a radio-frequency amplitude-modulation link for an input signal, the method comprising impressing the input signal and a separate locking signal onto the optical field of a suppressed carrier to generate an optical spectrum in a signal arm; splitting the optical spectrum to a microresonator and a finite impulse response filter, wherein the microresonator filters out one sideband derived from the input signal and wherein the finite impulse response filter passes the double sideband derived from the locking signal; and phase-dithering to stabilize the differential phase between the signal arm and a local-oscillator arm, thereby locking the optical phase of the radio-frequency amplitude-modulation link. A radio-frequency output signal may be recovered.

In some embodiments, the differential phase between the signal arm and the local-oscillator arm is periodically, or continuously, adjusted toward a maximum for the radio-frequency output signal. A phase-dithering frequency may be selected from about 100 Hz to about 300 Hz, for example.

The present invention also provides systems (e.g., devices and apparatus). In some variations, a system for amplitude modulation of a radio-frequency input signal includes the following components:

(a) one or more receivers for a radio-frequency input signal and a radio-frequency locking signal having a locking frequency;

(b) a laser source for generating a single-frequency optical carrier signal;

(c) a coupler/splitter for splitting the optical carrier signal to a signal arm and to a local-oscillator arm, wherein the optical carrier signal is suppressed in the signal arm to form a suppressed carrier;

(d) an electro-optic modulator for impressing the radio-frequency input signal and the radio-frequency locking signal onto the optical field of the suppressed carrier, to generate an optical spectrum in the signal arm;

(e) a photonic integrated circuit comprising a microresonator filter and a finite impulse response filter, each disposed in optical communication via first and second waveguides with first and second optical signals, respectively, derived from the optical spectrum, wherein the microresonator filter is configured to filter out one sideband of the first optical signal to generate a filtered first optical signal, and wherein the finite impulse response filter is configured to selectively pass the double sideband, associated with the locking frequency, of the second optical signal to generate a filtered second optical signal;

(f) a double-balanced receiver disposed in optical communication with the filtered first optical signal and the filtered second optical signal;

(g) a photodetector for recovering a radio-frequency output signal; and (h) a feedback loop that diverts a portion of the radio-frequency output signal through a bandpass filter, amplifier, envelope detector, and phase-locking circuit, to the local-oscillator arm, wherein the feedback loop is configured to provide dithering to at least partially stabilize the differential phase between the signal arm and the local-oscillator arm.

In some embodiments, the system comprises optical fibers for the amplitude modulation of the radio-frequency input signal. In some embodiments, the receiver for the radio-frequency input signal comprises a frequency channelizer. The electro-optic modulator may be a Mach-Zehnder electro-optic modulator. The microresonator filter may be an infinite impulse response filter. The finite impulse response filter may be a multi-tap transversal filter, with (for example) two or eight taps.

In some embodiments, the system further comprises an antenna linked to a radio-frequency antenna photonic channelizer. The system may include optical fibers for fiber-remoting of the antenna.

The present invention also provides a photonic integrated circuit comprising a two-arm interferometer coupled to a microresonator filter and to a transversal filter, wherein the microresonator filter is disposed in optical communication with a first waveguide. Such a photonic integrated circuit may be utilized in a variety of systems and devices.

In some embodiments, the microresonator filter (e.g., an infinite impulse response filter) is configured to filter out one sideband of a first optical signal to generate a filtered first optical signal, and the transversal filter (e.g., a two-tap or eight-tap finite impulse response filter) is configured to selectively pass a double sideband of the second optical signal to generate a filtered second optical signal.

The transversal filter in the photonic integrated circuit may be in optical communication with a second waveguide. In some embodiments, one of the arms of the two-arm interferometer comprises the first waveguide. In these or other embodiments, one of the arms of the two-arm interferometer comprises a second waveguide.

DETAILED DESCRIPTION OF EMBODIMENTS OF THE INVENTION

The methods and apparatus of the present invention will now be described in detail by reference to various non-limiting embodiments of the invention.

Unless otherwise indicated, all numbers expressing dimensions, frequencies, efficiencies, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

As used in this specification and the appended claims, the singular forms "a," "an," and "the" include plural referents unless the context clearly indicates otherwise.

Some variations of this invention provide a method to lock the optical phase of a single-sideband (SSB), carrier-suppressed coherent amplitude-modulation (AM) analog optical link. By locking the optical phase, a radio-frequency (RF) signal can be can be transmitted with high fidelity over optical fibers. Carrier-suppressed modulation means that only the sidebands of an amplitude-modulated wave are transmitted, the carrier being removed.

The present invention is premised, at least in part, on the realization that if a double-sideband, low-frequency input $\omega_L$ is impressed on an optical carrier, simultaneously with a RF-signal $\omega_m$, the frequency $\omega_L$ can be utilized to lock the differential phase as the RF-output at $\omega_L$ is maximized.

Some variations of the invention are applicable to the filtering of RF-photonic signals via use of resonance passbands derived from microresonators, such as microdisks or microrings. For coherent-AM SSB links that incorporate these microresonators, only one modulation sideband typically remains after filtering. It has been discovered that by incorporating a photonic integrated circuit (PIC) and a double-balanced receiver (DB RCVR), the optical phase of a SSB link can be locked stably to preserve amplitude/phase integrity for the RF-photonic signal. This configuration enables a SSB signal to be photodetected with surprisingly good phase stability, in spite of the fact that only one modulation sideband remains on the signal spectrum after passage through the microresonator(s).

In some embodiments, a system architecture includes a PIC designed to lock the differential phase $\phi_o$ between a signal arm and a local-oscillator (LO) arm, so that amplitude/phase stability can be maintained for the photodetected signal over a long time span, such as days, as dictated by the application. Specifically, in these and other embodiments, a finite impulse response (FIR) filter within the PIC provides a signal that has additional low-frequency ($f_L$), double-sideband modulation (DSB) on the optical carrier. After photodetection, the DSB modulation at $f_L$ enables $\phi_o$ to be locked using known dithering techniques.

Certain preferred embodiments of the present invention will now be described in more detail, by reference to the accompanying figures. The figures are understood to provide representative illustration of the invention and are not limiting in their content. It will be understood by one of ordinary skill in the art that the scope of the invention extends beyond the specific embodiments depicted. This invention also incorporates routine experimentation and optimization of the methods, apparatus, and systems described herein.

Figure 1:
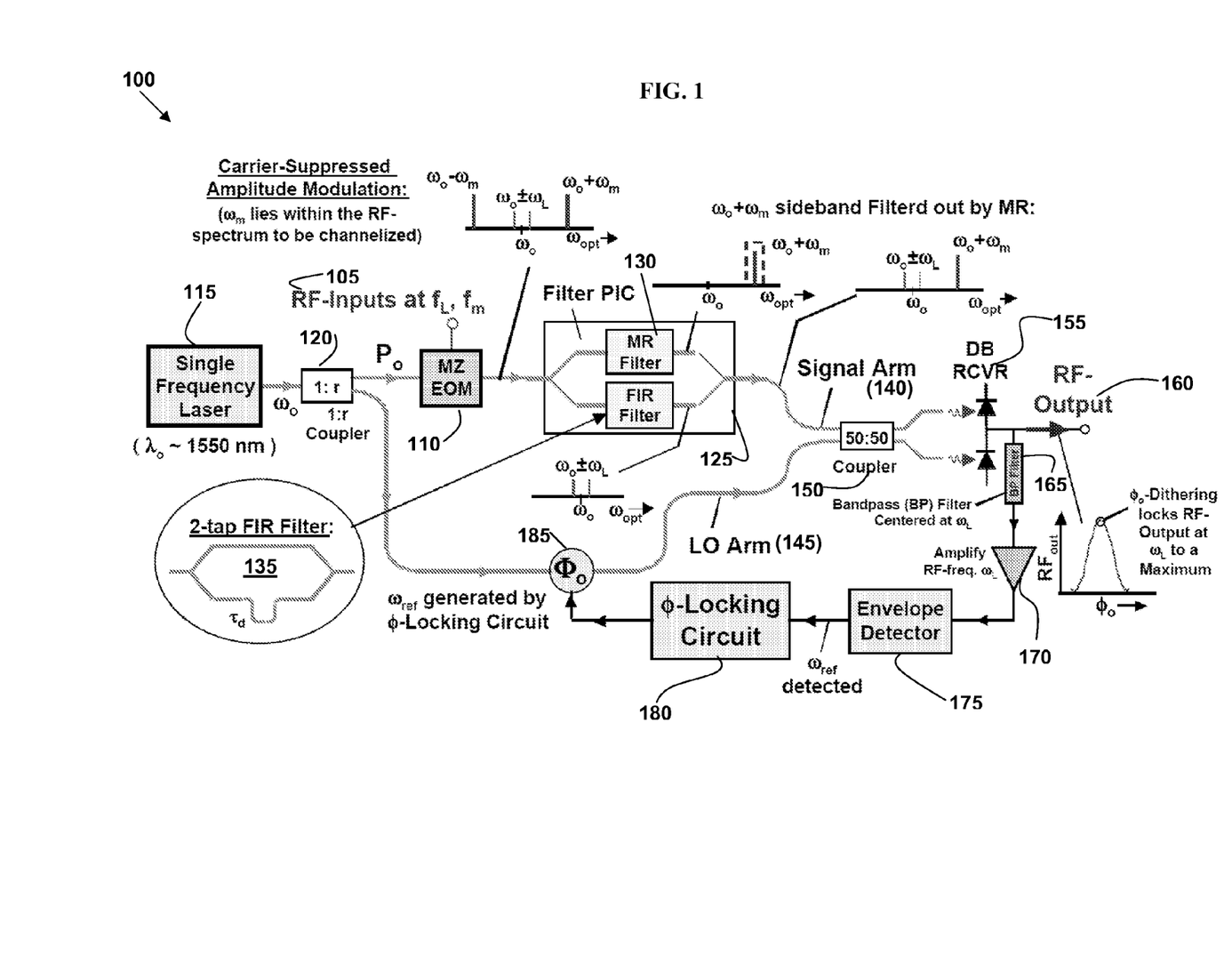
FIG. 1 is a schematic of a photonic system linking an optical-fiber RF signal between an input and output, to accomplish stable carrier-suppressed coherent amplitude modulation, according to some embodiments of this invention.

Some variations of the invention can be understood with reference to FIG. 1, which is not to be construed as limiting the scope of the invention. FIG. 1 shows a schematic 100 of a photonic system linking an optical-fiber RF signal between an input and output, to accomplish stable carrier-suppressed coherent amplitude modulation. The photonic system depicted can accomplish signal channelization and locking of the differential phase between the local-oscillator arm 145 and signal arm 140. The phase-locking circuit 180 stabilizes the RF-output 160 of the link.

An optical carrier is provided, in the example of FIG. 1, as a single-frequency laser 115 at a wavelength $\lambda_o$ of about 1550 nm. The optical-carrier frequency $\omega_o$ is not particularly limited. In some embodiments, $\omega_o$ is from about $10^5$ GHz to $10^7$ GHz (e.g., about $2 \times 10^5$ GHz at $\lambda_o \approx 1550$ nm). The optical carrier is suppressed via modulator bias for amplitude modulation (AM), so that "suppressed carrier AM" can be accomplished. In FIG. 1, carrier suppression is accomplished with a 1:r coupler 120 to split the optical carrier at $\omega_o$ into the signal arm 140 and local-oscillator arm 145.

Two RF-inputs 105 at the lock-frequency $\omega_L$ (=$2\pi f_L$) and at the frequency $\omega_n$, (=$2\pi f_m$) are fed to a Mach-Zehnder (MZ) electro-optic modulator (EOM) 110 biased at extinction. The RF-input at frequency $\omega_n$, and voltage amplitude $V_m$ is impressed into the optical field of the suppressed carrier. In channelizer applications, the RF-input to the MZ EOM is derived from the RF spectrum to be channelized for investigation or analysis. The RF-input 105 at frequency $\omega_L$ is an additional signal (with voltage amplitude $V_L$) that is fed to the EOM 110 to accomplish phase-locking of the coherent AM link.

Since the optical carrier at $\omega_o$ is suppressed, the optical spectrum of the modulated optical signal (after the MZ EOM 110) consists of four symmetrical sidebands located at $\omega_o \pm \omega_L$ and $\omega_o \pm \omega_m$. The optical spectrum is directed to a photonic integrated circuit (PIC) 125 comprised of a microresonator 130 and a finite impulse response (FIR) filter 135, the latter also being known as a transversal filter. Inside this PIC 125, the optical signal from the MZ EOM 110 is split to pass through two waveguide branches that are coupled respectively to the microresonator 130 and the FIR filter 135.

The optical field $E_s(t)$ feeding to the PIC 125 is given by:

$$E_s(t) = \frac{z_m}{2} \cdot \cos(\omega_m t)\cos(\omega_o t) + \frac{z_L}{2} \cdot \cos(\omega_L t)\cos(\omega_o t)$$

where $z_m = (\pi V_m)/(2V_\pi)$, and $z_L = (\pi V_L)/(2V_\pi)$; and $V_\pi$ is the voltage that changes the differential phase by 180 degrees (it radians).

An optical microresonator ("microresonator," "microdisk," or "micro-ring" as used herein) is an integrated optics structure with resonant optical coupling and feedback that allows a variety of functions such as filtering and optical switching. In the PIC 125 of FIG. 1, the microresonator 130 (or optionally, a plurality of microresonators) functions as a SSB filter for the signal from the MZ EOM 110. The microresonator filter 130 is further discussed in detail below.

Figure 2:
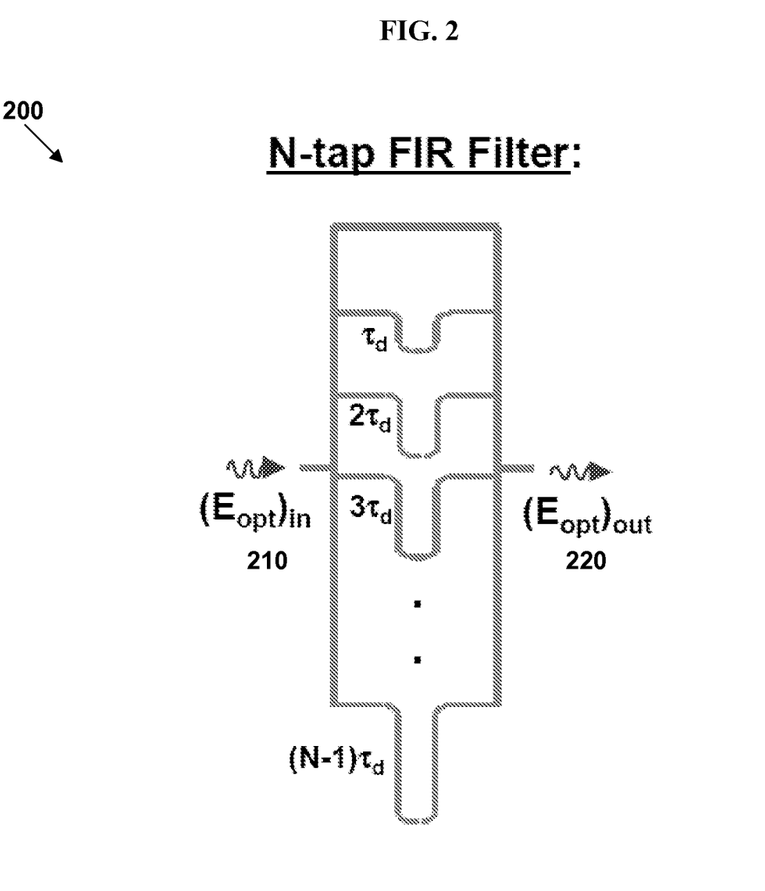
FIG. 2 is a schematic of an N-tap FIR filter that can be integrated into the PIC of FIG. 1, in some embodiments.

FIG. 2 is a schematic of an N-tap FIR filter 200 with input 210 and output 220. The N-tap FIR filter 200 can be integrated into the PIC 125 of FIG. 1. In some embodiments, the FIR filter 200 may be a two-tap transversal filter 135 with a tap-delay $\tau_d$, as depicted in the inset of FIG. 1. The normalized optical transfer function that defines the FIR filter passbands is given by:

$$H_o(\omega) = \left| \cos\left(\frac{\omega_o \tau_d}{2}\right) \right|$$

Hence, the maxima of the passbands for the FIR filter 200 are located at optical frequencies $\omega_o = (2N\pi)/\tau_d$, where N is an integer.

Figure 3:
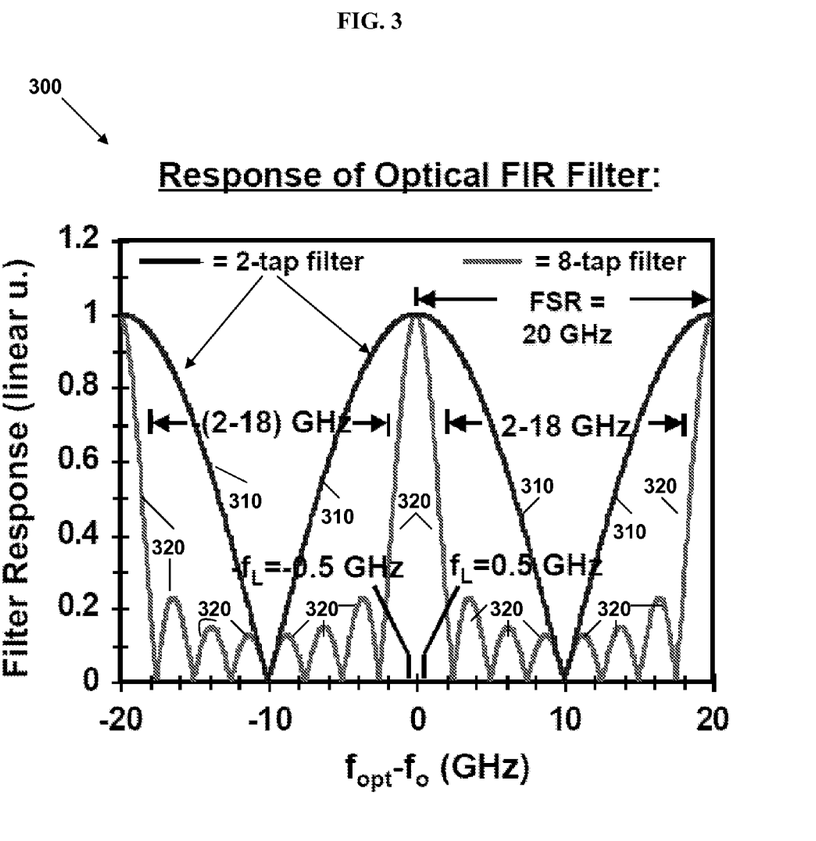
FIG. 3 is a plot of modeled filter responses (in the optical frequency domain) for a two-tap FIR filter and an eight-tap FIR filter, each with a free spectral range of 20 GHz ($\tau_d$=50 psec).

For a signal frequency $\omega_m$ lying within the X-band (8-12 GHz), a two-tap filter with a free spectral range of 20 GHz will reject the X-band signal adequately, while passing the two sidebands derived from an injected frequency $f_L$ of about 500 MHz (see FIG. 3). Specifically, a $\tau_d$ of 50 psec will set the free spectral range of the filter 135 to be 20 GHz ($1/\tau_d$). To generate a 50-psec tap-delay, the corresponding delay-length for a silica-based filter is about 1 cm. This can be fabricated easily with a 1-cm-long waveguide delay-line that would incur an insertion loss of less than 0.01 dB.

By utilizing more filter-taps for the FIR filter 135 or 200, the filter passbands can be made narrower to support the channelization of a wider RF spectrum (e.g., 2-18 GHz). For a FIR filter 200 with N taps (see FIG. 2), the normalized transfer function $H_o(\omega)$ that defines its passbands is given by $$H_o(\omega) = \frac{1}{N} \left| \frac{\sin\left(\frac{N\omega_o \tau_d}{2}\right)}{\sin\left(\frac{\omega_o \tau_d}{2}\right)} \right|$$

The free spectral range of the passbands is again given by $1/\tau_d$.

FIG. 3 plots the modeled filter responses 300 (in the optical frequency domain) for a two-tap FIR filter 310 and an eight-tap FIR filter 320, each with a free spectral range of 20 GHz ($\tau_d = 50$ psec). In the figure, $f_o$ is the frequency of the optical carrier generated by the laser source of the link. The modeled eight-tap filter 320 in FIG. 3 shows that the lock frequencies at $\omega_o \pm \omega_L$ will pass through the FIR filter 135 with little attenuation, while the frequencies at $\omega_o \pm \omega_m$ (2 GHz $< f_m <$ 18 GHz) will be rejected.

After passage through the microresonator 130 and the FIR filter 135, the signals from the two branches of the PIC 125 are recombined to form an incident signal (in the signal arm 140) for the double-balanced receiver (DB RCVR) 155. From the microresonator 130 branch, one sideband (e.g., the upper sideband at $\omega_o + \omega_m$) is filtered out by the passband of the microresonator 130. From the FIR filter 135 branch, the double sideband at $\omega_o \pm \omega_L$ introduced by the lock frequency $\omega_L$ is passed through. The recombined signals from the two PIC branches 130, 135 form an incident signal including $\omega_o \pm \omega_L$ plus either $(\omega_o + \omega_m)$ or $(\omega_o - \omega_m)$, depending on which sideband is filtered out by the microresonator 130.

As shown in FIG. 1, a phase-locking circuit ("φ-locking circuit" 180) is included in a feedback loop from the RF-output 160 of the DB RCVR 155 to a phase-dithering device 185. The phase-dithering device 185 is not limited and, in some embodiments, may be a piezo-drum that stretches the fiber in the local-oscillator arm, or an inline phase-modulator that operates at low frequencies. A typical dithering frequency $\omega_{ref}$ is selected from about 100 Hz to about 300 Hz.

After heterodyning the signal arm 140 with the local-oscillator arm 145, the RF photocurrent $\Delta i_d$ from the DB RCVR 160 is given by $$\Delta i_d = 2\eta z_L E_{full} E_{LO} \cos(\omega_L t)\cos(\phi_o) + \eta z_m E_{full} E_{LO} \cos(\omega_L t - \phi_o)$$

where $\phi_o = \psi + \pi/2$ and $\psi$ is the differential phase between the local-oscillator arm 145 and signal arm 140. The parameter $\eta$ is the responsivity of the photodetector (mA/mW); $z_L = (\pi V_L)/(2V_\pi)$ and $z_m = (\pi V_m)/(2V_\pi)$ are, respectively, the modulation indices of the lock-signal at $\omega_L$ and the RF-signal at $\omega_m$; $V_x$ is the voltage that changes the differential phase by 180 degrees ($\pi$ radians); t is time; $E_{full} = E_i/\sqrt{2}$ where $E_i$ is the amplitude of the optical field incident on the MZ EOM 110; and $E_{LO}$ is the amplitude of the optical field derived from the local-oscillator arm 145. In this equation, second-order terms involving $z_L$ and $z_m$ are neglected since $z_L \ll 1$ and $z_m \ll 1$ for small signal modulation. In other embodiments, second-order terms and even higher-order terms may be included in the equation for the RF photocurrent $\Delta i_d$.

With continued reference to FIG. 1, the feedback loop may be configured and operated as follows. Using a bandpass filter 165 centered at $\omega_L$, the photodetector's RF-output 160 is selectively passed at $\omega_L$ and amplified for envelope detection using an amplifier 170. The phase-locking circuit 180 in the feedback loop generates a phase-dithering signal (at frequency $\omega_{ref}$) for the local-oscillator arm 145 of the link. Therefore, the amplified RF-signal at $\omega_L$ will have a slow varying modulation envelope at the frequency $\omega_{ref}$. Using an envelope detector 175, the modulation envelope at $\omega_{ref}$ is stripped to form an input signal for the phase-locking circuit 180. An envelope detector 175 is an RF-circuit that takes a modulated high-frequency signal as its input and provides an output which is the modulation envelope of the high-frequency signal.

Since the RF-output at $\omega_L$ is proportional to $\cos^2(\phi_o)$, a phase-sensitive detection circuit (such as, but not limited to, a lock-in amplifier) is employed to sense $\phi_o$ from the sign of its mixer-output, where $\phi_o = \psi + \pi/2$ and $\psi$ is the differential phase between the local-oscillator arm and signal arm. Specifically, the mixer-output is proportional to $\cos(\Delta\phi_o)$, where $\Delta\phi_o$ is the differential phase between the reference dither-signal (generated by the phase-locking circuit 180) and the output of the envelope detector 175. For example, if $\cos(\Delta\phi_o) > 0$, the differential phase $\phi_o$ is located on the left-hand side of the $\omega_L$ maximum.

In this manner, $\phi_o$ can be at least periodically, and preferably continuously, adjusted towards the maximum of the RF-output 160 at $\omega_L$; $\phi_o = \pm N\pi$ at the RF-output maximum, where N is an integer. Once an RF-output 160 maximum is attained, the RF-output 160 can be effectively maintained to withstand small environmental perturbations of the optical phase $\phi_o$ via control of the phase-dither bias, such as through a phase-dithering device 185. With $\phi_o$ adjusted dynamically to $\pm N\pi$, the RF-photocurrent $\Delta i_d$ at frequency $\omega_n$, can be effectively phase-stabilized (or "phase-locked") during link deployment, even in the presence of $\phi_o$ fluctuations due to environmental or other random factors. This phase-locking, in turn, allows recovery of the RF-input 105 signal (at $\omega_m$) with a narrow linewidth (i.e., low or no corruption of the RF-linewidth).

Many of the system components shown in FIG. 1 are well-known in the art and can be readily provided or fabricated. Each of the laser source 115 (for the suppressed carrier) and the RF-inputs ($f_L$, $f_m$) 105 may be received, produced, or otherwise provided using various means as will be recognized by a person of ordinary skill in the art. Known devices or components include the couplers (120, 150), the Mach-Zehnder electro-optic modulator 110, the double-balanced receiver 155, the bandpass filter 165, the amplifier 170, the envelope detector 175, and the phase-locking circuit 180.

The photonic integrated circuit 125 includes a FIR filter 130 and a microresonator filter 135. In some embodiments, the microresonator 135 functions as a first-order Infinite Impulse Response (IIR) filter. In certain embodiments, fabrication of the PIC 125 incorporates recently developed principles described in copending U.S. patent application Ser. No. 12/183,064, entitled "RECONFIGURABLE OPTICAL FILTERS FORMED BY INTEGRATION OF ELECTRICALLY TUNABLE MICRORESONATORS," Ng et al., filed Jul. 31, 2008, commonly assigned with the assignee of the present patent application, and which is incorporated by reference herein in its entirety. In some embodiments, the FIR filter 135 in the PIC 125 may utilize the same waveguide fabric that couples vertically to the microresonator 135. Using this approach, the same waveguides lying underneath the microresonator 130 and which couple the modulated optical signal to the microresonator 130 may be used to form the two interferometer arms of the PIC 125.

Exemplary design principles for the microresonator and waveguides of the PIC 125 will now be discussed, without limiting the scope of the invention.

In some embodiments, an active Si microdisk (microresonator) is heterogeneously integrated by vertical coupling with a wafer of low-loss silica waveguides underneath. The heterogeneous integration can be accomplished with the use of wafer-bonding, such as oxide bonding. Various known bonding methods may be used. In variations, the bonding process can be activated by temperature, a plasma, certain chemicals, or by some other means.

One method of bonding is anodic bonding (electrostatic bonding). The wafer and substrate are brought together and heated to a high temperature. A large electric field is applied across the joint, which causes an extremely strong bond to form between the two materials. Other bonding methods include using an adhesive layer, such as a glass (e.g., borosilicate glass), or photoresist.

Another bonding technique makes use of spin-on glass as the interface material. The spin-on glass film may be deposited on either surface, but it may be more convenient to deposit that film on the optical waveguide layer. Typical spin-on glass film thicknesses are in the hundreds of nanometers. The bonding is done at room temperature and the substrate is annealed at temperatures ranging from 200-225° C., for example. It is also possible to bond wafers directly together using gentle pressure (direct bonding).

The heterogeneous integration is preferably accomplished via oxide-bonding, which is common and will be understood by the skilled artisan. Before bonding, the exposed waveguide layer surface may be (but is not necessarily) polished to ensure that it is flat and cleaned to remove any particles or residue.

The size of the microresonator and the refractive index of its resonant optical mode determine the resonant frequencies of the microresonator, which are the frequencies of light that can be coupled efficiently into and out of the resonator element. By controlling the thickness of the evanescent-coupling layer, one can attain a high degree of reproducibility in setting the coupling between microdisk and waveguides. Vertical coupling allows ultra-low loss (<0.01 dB/cm) silica waveguides to be integrated heterogeneously with tunable semiconductor microresonators. This, in turn, enables a higher signal-to-noise ratio and a "spur-free" (spurious-free) dynamic range at the output of a microresonator filter.

Figure 4:
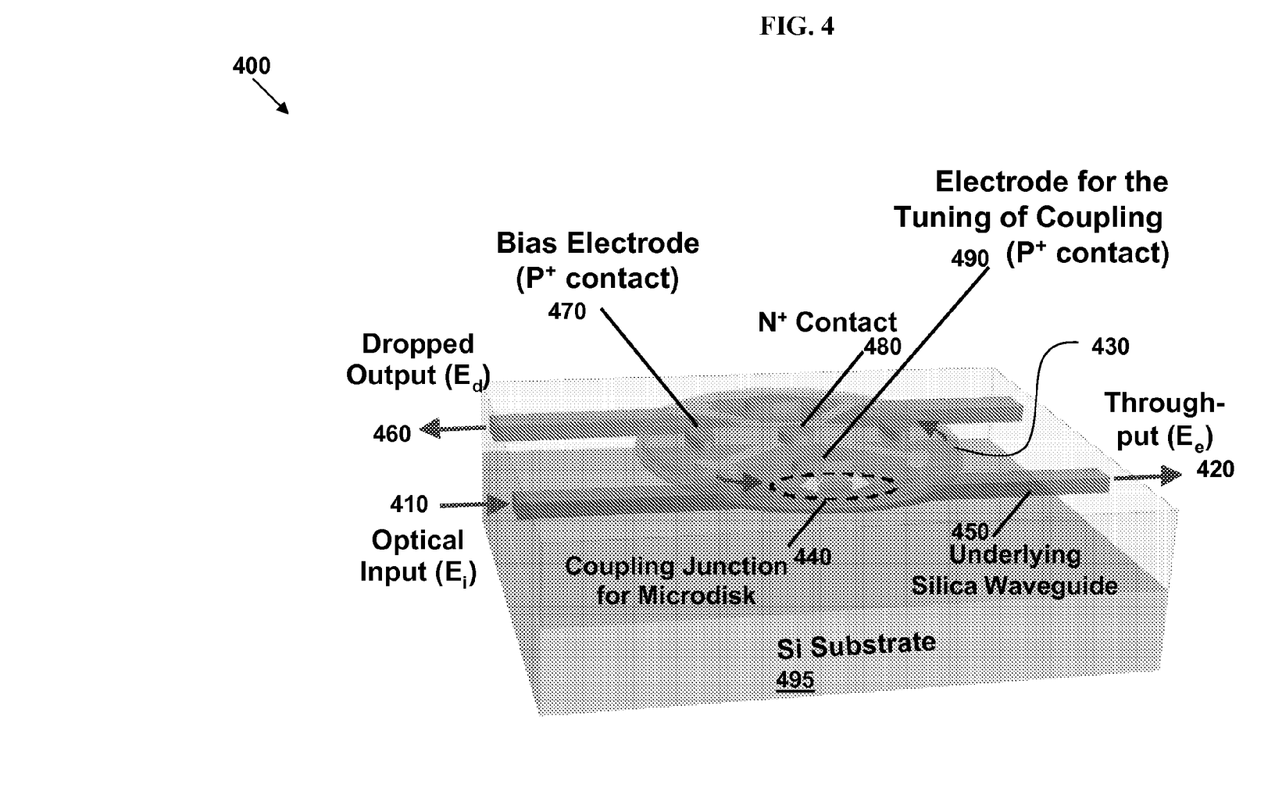
FIG. 4 is an illustration showing a vertically coupled Si microresonator with contact electrodes designed for the tuning of resonance frequencies and coupling, in some embodiments of the invention.
Figure 5:
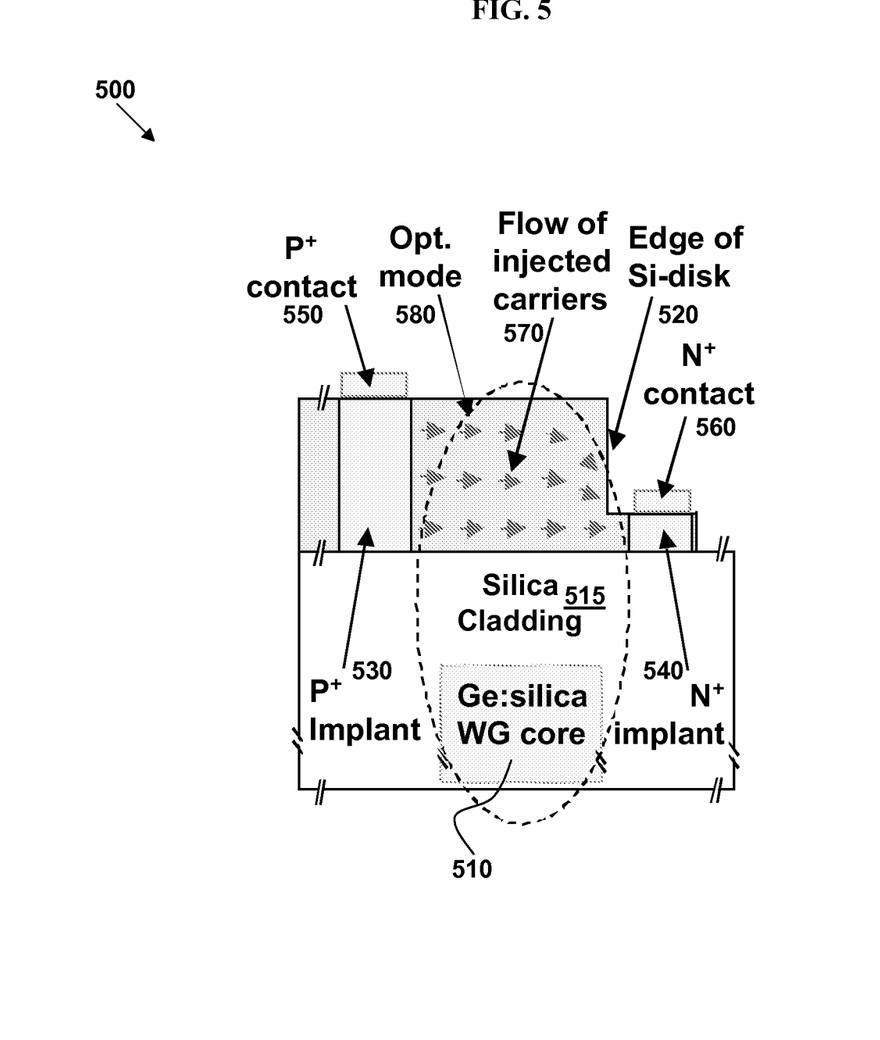
FIG. 5 is a cross-section illustration (looking into the optical input waveguide of FIG. 4) of the coupling junction between microdisk and silica waveguide, in some embodiments.

FIGS. 4 and 5 depict design details for tuning-electrodes and bias-electrodes, according to some embodiments of a tunable microresonator 130. FIG. 4 shows a vertically coupled Si microresonator 400 with contact electrodes (470, 480, 490) designed for the tuning of resonance frequencies and coupling. It is noted that in FIG. 4, the disk 430 is flat on the silica cladding 450, which can be preferable in some embodiments but is by no means the only manner of adjacency between disk 430 and silica 450.

FIG. 5 shows a cross section 500 (looking into the optical input waveguide 410 of FIG. 4) of the coupling junction between microdisk and silica waveguide. This illustration shows how carrier injection may be used to control the difference in refractive index, and hence control evanescent coupling. Light is vertically coupled from the Ge:silica waveguide 510 core to the Si microdisk 520, and vice versa. The silica cladding 515 must have a lower refractive index than the Ge-doped waveguide core 510 for waveguiding to occur.

An evanescent wave is a guided mode exhibiting exponential decay with distance. Evanescent waves are formed when sinusoidal waves are (internally) reflected off an interface at an angle greater than the critical angle so that total internal reflection occurs. The physical explanation for their existence is that the electric and magnetic fields cannot be discontinuous at a boundary, as would be the case if there were no evanescent field. Practically speaking, evanescent coupling means that the optical mode of the light traveling through the waveguide extends vertically into the microresonator.

A waveguide-core 510 of Ge-doped silica, surrounded by silica cladding 515, is preferred because it is known to be characterized by a low waveguide loss (per length basis). The level of Ge doping can be selected to provide relative refractive-index differences ($\Delta n/n$) of 0.65% to 3%, such as that employed in commercial devices, or some other level of Ge doping. Other dielectric waveguides can be used, including for example $Si_xN_y$ cladded by silica, or silicon oxynitride (SiON) cladded by silica, among other possibilities as will be appreciated.

FIG. 5 shows the formation of a PIN diode from two contacts (550, 560) and two doped regions, a P⁺ region 530 and an N⁺ region 540. A PIN diode (Positive Intrinsic Negative diode) is a diode with a wide, undoped intrinsic semiconductor region between p-type semiconductor and n-type semiconductor regions. In some embodiments, the thickness of the silica cladding layer 515, along with the voltage applied to the PIN diodes, can control the coupling between the optical mode 580 of the microresonator 520 and the waveguide 510. To best control evanescent coupling of the optical mode 580 into the microresonator 520, the thickness of the silica cladding 515 is preferably less than about 5 microns. This coupling is varied through the injection of carriers from the PIN diodes to effectively change the index of refraction locally through the Kramers-Kronig relationship.

While preferred embodiments have been described as providing a Si microresonator, other semiconductor materials can certainly be used, such as III-V semiconductors with a wider bandgap (e.g. GaAs or InP) than the photon energy of 1550-nm light, or semiconductor heterostructures (such as GaInAsP/InP or AlInAs/GaInAsP), or even II-V semiconductors. Photolithographic and etching technologies are available to the skilled artisan to fabricate a microdisk with smooth sidewalls from the chosen material, so that a good quality-factor (Q) can be attained at resonance.

Si is a preferred material for the microdisk of the invention, because use of Si renders it typically easier to fabricate a sidewall that is smooth enough to attain a high quality-factor (high Q) for the microdisk. In addition, wafer-bonding to an underlying silica-waveguide structure is generally easier with a Si microdisk. GaAs or InP have the advantage that the electro-optic effect can be used to tune the coupling and resonance-frequency for the microdisk.

Uses for the present invention include, but are by no means limited to, high-resolution RF-photonic channelizers that cover a wide instantaneous bandwidth.

Other uses include antenna remoting offered by the disclosed coherent-AM optical link. Antenna assets for military and commercial satellite communications as well as radar applications must often be located at a distance from ground stations. Redundancy requirements may dictate multiple antenna locations. In military settings, deployed antenna assets, as potential targets, are remotely located to protect personnel. Commercial cellular communications likewise may include system architectures where a single base station serves multiple cell sites. Satellite downlinks and GPS receivers also often require remote antenna locations. An amplitude-modulation link as provided herein may be inserted into a RF photonic channelizer to provide fiber-remoting for an antenna.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan. This invention also incorporates routine experimentation and optimization of the structures, systems, and methods described herein.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of carrier-suppressed amplitude modulation of a radio-frequency input signal, said method comprising:
   (a) receiving a radio-frequency input signal;
   (b) providing a radio-frequency locking signal having a locking frequency;
   (c) providing a single-frequency optical carrier signal;
   (d) splitting said optical carrier signal to a signal arm and a local-oscillator arm, wherein said optical carrier signal is suppressed via optical modulator bias in said signal arm to form a suppressed carrier;
   (e) impressing said radio-frequency input signal and said radio-frequency locking signal onto the optical field of said suppressed carrier using an electro-optic modulator, thereby generating an optical spectrum in said signal arm;
   (f) introducing said optical spectrum to a photonic integrated circuit comprising a microresonator filter and a finite impulse response filter, wherein said optical spectrum is split to pass (1) a first optical signal through a first waveguide branch coupled to said microresonator filter and (2) a second optical signal through a second waveguide branch coupled to said finite impulse response filter;
   (g) filtering out one sideband of said first optical signal with said microresonator filter, to generate a filtered first optical signal;
   (h) selectively passing a double sideband, associated with said locking frequency, of said second optical signal through said finite impulse response filter, to generate a filtered second optical signal;
   (i) introducing said filtered first optical signal and said filtered second optical signal to a double-balanced receiver; and
   (j) recovering a radio-frequency output signal from said double-balanced receiver,
   wherein a feedback loop from said radio-frequency output signal back to said local-oscillator arm is configured to provide dithering to at least partially stabilize the differential phase between said signal arm and said local-oscillator arm.

2. The method of claim 1, wherein said differential phase between said signal arm and said local-oscillator arm is periodically adjusted toward a maximum for said radio-frequency output signal.

3. The method of claim 1, wherein said differential phase between said signal arm and said local-oscillator arm is continuously adjusted toward a maximum for said radio-frequency output signal.

4. The method of claim 1, whereby said radio-frequency output signal is phase-stabilized in the presence of environmental perturbations or random fluctuations.

5. The method of claim 1, wherein said amplitude modulation is temporally coherent for heterodyne photodetection.

6. The method of claim 1, wherein said method comprises amplitude modulation of said radio-frequency input signal over optical fibers.

7. The method of claim 1, wherein said radio-frequency input signal is derived from a channelized spectrum.

8. The method of claim 1, wherein said finite impulse response filter has a free spectral range of about 20 GHz.

9. The method of claim 1, wherein said dithering utilizes a dithering frequency selected from about 100 Hz to about 300 Hz.

10. The method of claim 1, said method further comprising configuring a radio-frequency antenna photonic channelizer with a link for providing said carrier-suppressed amplitude modulation of an input signal to an antenna.

11. The method of claim 1, said method further comprising fiber-remoting of said antenna.

12. A method for locking the optical phase of a radio-frequency amplitude-modulation link for an input signal, said method comprising impressing said input signal and a separate locking signal onto the optical field of a suppressed carrier to generate an optical spectrum in a signal arm; splitting said optical spectrum to a microresonator and a finite impulse response filter, wherein said microresonator filters out one sideband derived from said input signal and wherein said finite impulse response filter passes a double sideband derived from said locking signal; and phase-dithering to stabilize the differential phase between said signal arm and a local-oscillator arm, thereby locking said optical phase of said radio-frequency amplitude-modulation link.

13. The method of claim 12, said method further comprising recovering a radio-frequency output signal.

14. The method of claim 12, wherein said differential phase between said signal arm and said local-oscillator arm is continuously adjusted toward a maximum for said radio-frequency output signal.

15. The method of claim 12, wherein said phase-dithering utilizes a dithering frequency selected from about 100 Hz to about 300 Hz.

16. A system for amplitude modulation of a radio-frequency input signal, said system comprising:
(a) one or more receivers for a radio-frequency input signal and a radio-frequency locking signal having a locking frequency;
(b) a laser source for generating a single-frequency optical carrier signal;
(c) a coupler/splitter for splitting said optical carrier signal to a signal arm and to a local-oscillator arm, wherein said optical carrier signal is suppressed in said signal arm to form a suppressed carrier;
(d) an electro-optic modulator for impressing said radio-frequency input signal and said radio-frequency locking signal onto the optical field of said suppressed carrier, to generate an optical spectrum in said signal arm;
(e) a photonic integrated circuit comprising a microresonator filter and a finite impulse response filter, wherein said microresonator filter is configured to filter out one sideband of a first optical signal to generate a filtered first optical signal, and wherein said finite impulse response filter is configured to selectively pass a double sideband, associated with said locking frequency, of a second optical signal to generate a filtered second optical signal;
(f) a double-balanced receiver disposed in optical communication with said filtered first optical signal and said filtered second optical signal;
(g) a photodetector for recovering a radio-frequency output signal; and
(h) a feedback loop that diverts a portion of said radio-frequency output signal to said local-oscillator arm, wherein said feedback loop is configured to provide dithering to at least partially stabilize the differential phase between said signal arm and said local-oscillator arm.

17. The system of claim 16, said system comprising optical fibers for said amplitude modulation of said radio-frequency input signal.

18. The system of claim 16, wherein said one or more receivers for said radio-frequency input signal comprises a frequency channelizer.

19. The system of claim 16, wherein said electro-optic modulator is a Mach-Zehnder electro-optic modulator biased at extinction.

20. The system of claim 16, wherein said microresonator filter is an infinite impulse response filter.

21. The system of claim 16, wherein said finite impulse response filter is a multi-tap transversal filter.

22. The system of claim 16, wherein each of said microresonator filter and said finite impulse response filter are disposed in optical communication via first and second waveguides with first and second optical signals, respectively, derived from said optical spectrum.

23. The system of claim 16, wherein said feedback loop includes a bandpass filter, amplifier, envelope detector, and phase-locking circuit.

24. The system of claim 16, said system further comprising an antenna linked to a radio-frequency antenna photonic channelizer.

25. The system of claim 24, said system further comprising optical fibers for fiber-remoting of said antenna.

26. A photonic integrated circuit comprising a two-arm interferometer coupled to a microresonator filter and to a transversal filter, wherein said microresonator filter is disposed in optical communication with a first waveguide, wherein said microresonator filter is configured to filter out one sideband of a first optical signal to generate a filtered first optical signal, and wherein said transversal filter is configured to selectively pass a double sideband of a second optical signal to generate a filtered second optical signal.

27. The photonic integrated circuit of claim 26, wherein said transversal filter is in optical communication with a second waveguide.

28. The photonic integrated circuit of claim 26, wherein one of the arms of said two-arm interferometer comprises said first waveguide.

29. The photonic integrated circuit of claim 28, wherein one of the arms of said two-arm interferometer comprises said second waveguide.

* * * * *